United States Patent [19]
Boniort et al.

[11] Patent Number: 4,874,415
[45] Date of Patent: Oct. 17, 1989

[54] METHOD OF MANUFACTURING A HIGH MECHANICAL STRENGTH OPTICAL FIBER BY DRAWING UNDER HIGH TENSION

[75] Inventors: Jean-Yves Boniort, Limours; Jacques Leboucq, Sainte Genevieve Des Bois, both of France

[73] Assignee: Alcatel N.V., Amsterdam, Netherlands

[21] Appl. No.: 281,604

[22] Filed: Dec. 9, 1988

[30] Foreign Application Priority Data

Dec. 10, 1987 [FR] France ............................. 87 17220

[51] Int. Cl.$^4$ ..................... C03B 37/027; C03C 25/02
[52] U.S. Cl. ....................................... 65/3.11; 65/3.4; 65/12.13
[58] Field of Search ................ 65/2, 3.11, 3.4, 12, 65/13

[56] References Cited

U.S. PATENT DOCUMENTS

| | | | |
|---|---|---|---|
| 3,697,241 | 10/1972 | Strickland et al. ...................... | 65/2 |
| 3,881,902 | 5/1975 | De Luca ................................ | 65/12 |
| 4,249,925 | 2/1981 | Kawashima et al. ................. | 65/13 X |
| 4,304,582 | 12/1981 | Aussenegg et al. .................... | 65/12 |
| 4,396,409 | 8/1983 | Bailey et al. .......................... | 65/3.11 |
| 4,504,300 | 3/1985 | Gauthier et al. .................... | 65/12 X |

FOREIGN PATENT DOCUMENTS 0112223  6/1980  European Pat. Off. .
0012223  6/1984  European Pat. Off. .

OTHER PUBLICATIONS

Patent Abstracts of Japan, vol. 10, No. 36 (C-328)[2093], 13 Fevrier 1986; & JP-A-60 186 430 (Nippon Denshin Denwa Kosha) 21-09-1985.
Patent Abstracts of Japan, vol. 8, No. 71 (C-217)[1508], 3 Avril 1984; & JP-A-58 223 636 (Nippon Denshin Denwa Kosha) 26-12-1983.
Patent Abstracts of Japan, vol. 6, No. 231 (C-135)[1109], 17 Nov. 1982; & JP-A-57 135 739 (Nippon Denshin Denwa Kosha) 21-08-1982.

*Primary Examiner*—Robert L. Lindsay
*Attorney, Agent, or Firm*—Sughrue, Mion, Zinn, Macpeak & Seas

[57] ABSTRACT

An optical fiber (F) is pulled by a capstan (6) from a silica preform (1) whose bottom end (20) is softened in an oven (2). After cooling, said fiber is coated with an organic protective coating by means of a coating device (4). According to the invention, the surface of the fiber is reheated under tension by means of a torch (14) upstream from the covering device. Tension stresses in the softened surface layer are therefore relaxed. Cooling, followed by the fiber-drawing tension being removed after the capstan (6) cause said surface layer to be put under permanent compression, thereby reducing the risk of the fiber breaking. The invention is applicable to manufacturing fibers having improved characteristics.

1 Claim, 3 Drawing Sheets

METHOD OF MANUFACTURING A HIGH MECHANICAL STRENGTH OPTICAL FIBER BY DRAWING UNDER HIGH TENSION

The present invention relates to manufacturing high mechanical strength optical fibers.

It is known that optical fibers intended for submarine telecommunications cables, for example, must provide low attenuation to the light that they guide (in order to reduce the number of repeaters that need to be distributed along the cable), while simultaneously having high mechanical strength (in order to make it relatively easy to lay the cable from a cable ship).

The optical fibers currently intendef for this type of utilization are monomode fibers in which the core glass and the cladding glass are made of nearly pure silica for the purpose of guiding infrared light. They have a core diameter of about 10 micrometers ($\mu$m) and a total silica diameter of about 125 $\mu$m.

Such fibers are conventionally obtained by a continuous fiber-drawing operation, i.e. a preform is heated to above its softening temperature Tg and fiber is draw therefrom with visco-elastic deformation taking place under an appropriate, so-called "fiber-drawing" tension. The preform is a cylindrical mass of silica obeying an appropriate internal composition law as a function of its radius. The drawing speed is servo-controlled so as to obtain the desired final diameter.

This fiber-drawing operation is followed by a continuous covering operation with the fiber being covered by an organic protective covering. The covering does not withstand high temperatures such as the softening temperature of silica. It contributes little to the strength of the fiber against longitudinal traction forces and it does not prevent the fiber from elongating and subjecting itself to high tension in the presence of such longitudinal forces. However the covering does oppose dangerous bending and it provides effective protection for the outside surface of the silica fiber against mechanical and chemical attack. The fiber-drawing tension is applied to the fiber through said protective covering. More precisely, this tension is applied by a capstan which rotates about its axis in order to pull the covered fiber, i.e. the fiber provided with said protective covering.

The fiber-drawing tension used for manufacturing numerous monomode silica fibers is low, e.g. about 0.1N. It is known that the optical quaity of some fibers (i.e. their suitability for transmitting light at low loss) may be improved by using an increased fiber-drawing tension, e.g. about 1.40N. This is particularly true of fibers having a core which is heavily doped with germanium. Unfortunately, the mechanical strength of the fiber is considerably reduced. More precisely, during a proofing test performed at an elongation of 1.5%, the frequency of fiber breaks due to surface microcracks rises from 0.3 breaks per 10 km to 1 break per 10 km.

In a first known improved method, the frequency of breakages due to surface microcracks is reduced by a so-called "thermal polishing" preparation of the lateral surface of the preform from which fiber-drawing takes place. It is this initial lateral surface from which the lateral surface of the fiber is formed. It therefore appears that defects in said final surface come from defects in said initial surface. And it is also known that the cracks which give rise to the fiber breaking stem most often from defects in said final surface.

The thermal polishing in question consists in briefly heating the lateral surface of the preform prior to fiber-drawing to a temperature which is higher than its softening temperature, thereby practically melting a thin surface layer and evaporating a portion thereof. Surface microcracks that were detectable prior to said operation are no longer detectable thereafter.

One such surface preparation is described in the article entitled "Improvement of optical fiber strength for submarine cables" by J. Y. Boniort, J. Leboucq, P. Bacle, E. Reinaudo, in SPIE, Vol. 584, Optical Fiber Characteristics and Standards (1985).

In many cases, this preparation makes it possible to reduce the frequency of breaks in fibers in service to a very considerable extent. Unfortunately, with the above-mentioned increased fiber-drawing tensions, this preparation does not reduce the frequency sufficiently.

According to a second known improved method for reducing the frequency of said breaks, a surface layer of the preform is doped with titanium oxide. Such doping reduces the coefficient of expansion of the silica. Said coefficient becomes zero at a 5% molar concentration of titanium oxide, and negative at higher concentrations. While the fiber is being cooled, the doped surface layer tends to contract less than the underlying silica. It is thus permanently subjected to compression stress by the remainder of the cross-section of the fiber which is therefore subjected to permanent residual tension. This permanent compression in the surface layer may be about 35 MPa for a 5% concentration of titanium oxide. It reduces the risk of cracks propagating in said layer, and it therefore reduces the risk of the fiber breaking from surface cracks. More particularly, it improves the resistance of fibers to fatigue, i.e. it reduces the degragation over time observed in the mechanical strength of fibers subjected to permanent elongation. However, this improvement is obtained at the detriment of the initial intrinsic mechanical strength when the fiber is subjected to high elongation speeds of more than about 0.1% per minute. Also, such surface doping requires an additional manufacturing operaton which increases the cost of the final product.

The advantages of such surface doping in the preform is described in an aritcle entitled "O.V.D. Process Modification for Improved Optical Fiber Strength Reliability" by J. E. Ritter and J. D. Helfinstine presented at the MFOC Conferences in Washington, 16–19 (Mar., 1987.

The present invention has the particular object of reducing the risk of glass fibers breaking in the presence of traction and/or bending forces.

More particularly, the object of the present invention is to reduce said risk in optical fibers made of silica glass manufactured under high fiber-drawing tension.

Another object of the invention is to give such optical fibers, in particular monomode fibers increased light-guiding qualities and reduced risk of breakage while being put into service.

The invention also seeks to achieve these objects by means of a manufacturing method which is simple, reliable, and cheap.

More specifically, the present invention provides a method of manufacturing an optical fiber by drawing, said method being intended to provide a fiber constituted by glass and surrounded by an organic protective coating, said fiber having an axis, a fiber outside radius, and a composition which is uniform along the lengthwise direction of the fiber and which follows an internal composition law inside the fiber relating the composition of each point of the fiber to the relative radius of the point, with the relative radius of any point being given by the ratio of the measured distance between said point and the axis divided by the ouside radius, said method comprising the following operations:

preparing a glass preform having the same internal composition law as the fiber to be made, but having an initial outside radius which is larger than said outside radius of the fiber;

continuous fiber-drawing, said fiber-drawing comprising the following operations:

heating a lengthwise end portion of said preform in order to soften it right through to constitute a visco-elastic mass;

applying sufficient longitudinal fiber-drawing tension to said visco-elastic mass to cause the glass thereof to be drawn down in a drawing-down zone with the outside radius of the mass of glass reducing progressively until said radius reaches said outside radius of the fiber, while said internal composition law is conserved such that the result of said operation is to constitute said fiber;

progressively cooling the glass from its surface in said drawing-down zone in such a manner that a sufficiently large fraction of the cross-section of said glass solidifies in a surface solidification zone at the end of said drawing-down zone for said solidified fraction to withstand said fiber-drawing tension elastically once its outside radius reaches said outside radius of the fiber; and further cooling the fiber obtained in this way in an additional cooling zone in order to solidify the glass of the fiber completely;

said fiber-drawing operation being followed, in a covering zone downstream from said additional cooling zone, by a covering operation during which said protective covering is applied around the fiber resulting from said fiber-drawing in order to protect the surface thereof;

said fiber-drawing tension being applied to said viscoelastic mass and to said fiber via said protective covering in a traction zne situated downstream from said covering zone;

said method being characterized by the fact that it further includes:

treatment consisting in a surface reheating operation under tension through an average thickness lying between 5 microns and 10 microns, said operation being performed during said fiber-drawing operation in a reheat zone between said additional cooling zone and said covering zone, and in which the outside surface of the fiber under a tension lying in the range of 0.4N to 1.4N is heated sufficiently to cause a surface layer of said fiber to soften, thereby eliminating any surface microcracks that may result from said fiber-drawing operation, with the duration of sid reheating being sufficiently short to ensure that a majority axial fraction of the cross-section of the fiber remains solid and withstands said fiber-drawing tension elastically; and a second cooling operaton in a second cooling zone between said reheating zone and said covering zone, thereby solidifying said surface layer while said majority axial fraction is still under tension for withstanding said fiber-drawing tension, such that said majority axial fraction retains a permanent residual tension downstream from said traction zone, thereby applying permanent longitudinal compression to said solidified surface layer.

The invention is particularly applicable when said optical fiber is constituted by a silica glass and has an outside diameter of 125 micrometers and where said fiber-drawing tension measured on the bare fiber lies between about 60 g and 140 g.

In such cases, the reheating energy applied to said fiber in order to perform said reheating operation under tension may be applied by means of a reheating torch operating with respective oxygen and hydrogen flow rates of about 5 l/min and about 10 l/min. It may alternatively be applied by any other appropriate heating means, such as an electric arc, a $CO_2$ laser, ... etc.

The quantity of energy to be applied varies as a function of the height of the heating zone and of the fiber-drawing speed.

An implementation of the invention in the context of the above definition is described below by way of non-limiting example and with reference to the accompanying diagrammatic figures. It should be understood, that without going beyond the scope of the invention, the items described and shown may be replaced by other items which provide the same technical functions. When the same item is shown in several figures it is designated therein by the same reference symbol.

Figure 1:
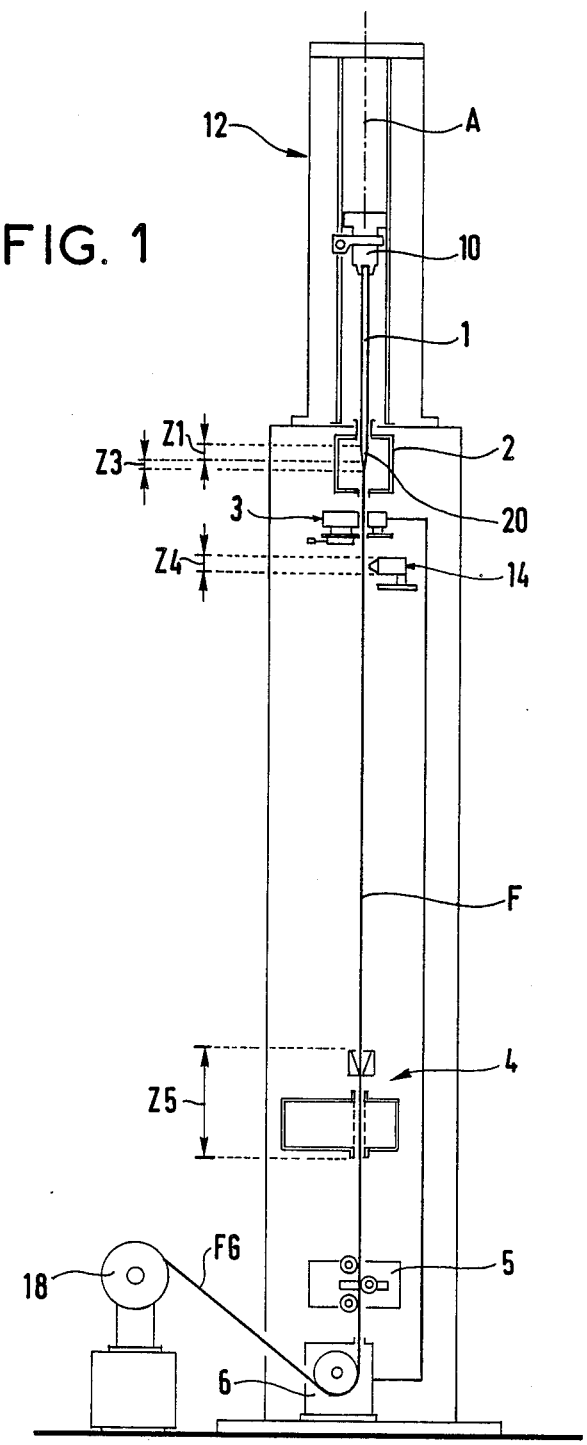
FIG. 1 shows a fiber-drawing tower for implementing the method of the invention.

As shown in FIG. 1, a preform 1 is disposed vertically in the top portion of a fiber-drawing tower 12. Its bottom end is disposed in a fiber-drawing oven 2. Its top end is held by a holding member 10. Furing the fiber-drawing operation, said member moves downwards to accompany the shortening preform so as to maintain the bottom end of the preform at a constant level in the oven 2.

The oven 2 heats said bottom end so as to form said visco-elastic mass 20 from which an optical fiber F is drawn. The continuous formation of new lengths of said fiber from said mass results from traction which is exerted by a capstan 6 at the bottom of the tower 12 on lengths that have already been formed. The capstan pulls the fiber at a fiber-drawing speed which defines the drawing tension and which is servo-controlled in such a manner as to obtain the desired fiber diameter, said diameter being twice said outside radius of the fiber.

The servo-control is achieved, in particular, on the basis of a diameter-measuring sensor 3 disposed at the outlet from the oven 2 in a zone where the fiber has solidified right through. The tower includes various other servo-systems that are not shown.

Figure 2:
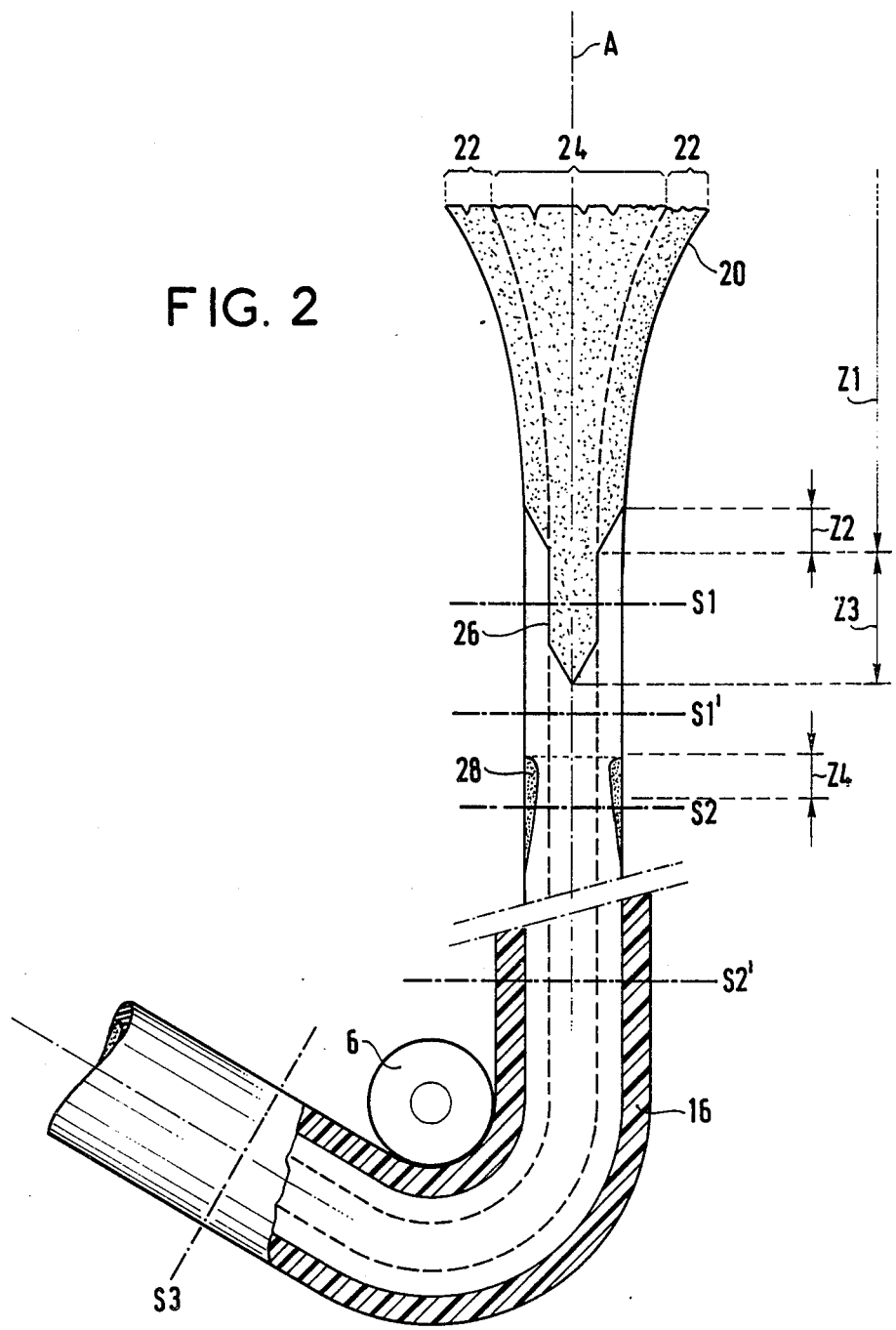
FIG. 2 is an axial section through an end portion of a said visco-elastic mass at the end of a preform during drawing, and through two lengths of a fiber taken from said mass and while inside the FIG. 1 tower.

After the sensor 3, the fiber cools further (e.g. to about 200° C.), after which it passes through a reheat torch 14 which performs said operation of surface reheating under tension, locally forming a softened surface layer (see FIG. 2).

The fiber then passes through a covering device 4 which forms said organic protective covering 16 (see FIG. 2) by coating plastic material around the fiber and by irradiating the plastic material coated in this way on the surface of the fiber with ultraviolet radiation in order to cure the plastic.

The covered fiber FG then passes through a tension measuring device 5. Thereafter it passes round to the capstan 6 which applies said fiber-drawing tension thereto such that said tension is exerted between the holding device 10 and the capstan.

The capstan 6 delivers the covered fiber to a pick-up and storage reel 18 which merely applies a small amount of winding tension to the fiber, which tension is assumed, below, to be negligible.

As shown in FIG. 2, the visco-elastic mass 20 has an axis A. This mass is sometimes called the "drawing down cone". At its periphery it has an outer layer 22 of non-doped silica resulting from deformation of the support tube from which the preform 1 was formed by depositing successive inside layers therein and then by collapsing the tube in order to eliminate the residual axial empty space. Around the axis A and inside the layer 22, the mass 20 comprises an axial portion 24 constituted by silica doped with various substances in conformity with said internal composition law so as to subsequently form the cladding and the core of the optical fiber to be manufactured. This axial portion results from the deformation of the inside layers that were previously deposited on the inside surface of said support tube. The doping of the silica in said portion 24 causes its softening temperature Tg to be reduced by about 100° C. to about 200° C. relative to the softening temperature of the outside layer 22. The temperature of the mass 20 is greater than both of these temperatures such that the substance therein is soft and exhibits visco-elastic behavior.

The substance behaving in this way is represented by stippling. A line 26 represents a transition surface situated at the bottom of the visco-elastic mass 20 and such that substance on one side of this surface is softened and has said visco-elastic behavior, while substance on the other side thereof (beneath or further away from the axis A) has slidified and has taken up elastic behavior since cooling from its outside surface has reduced its effective temperature to beneath its softening temperature. In a section S1, the effective temperature lies between the softening temperature of non-doped silica and that of doped silica, thereby causing the outer layer to exhibit elastic behavior while the axial portion still exhibits visco-elastic behavior. In contrast, in a section S1' further down, the substance has solidified right through. Still further down, a section S2 level with and immediately beneath the torch 14 of FIG. 1 has a softened surface layer 28, i.e. the surface layer is again exhibiting visco-elastic behavior, by virtue of said surface reheating operation under tension.

FIGS. 1 and 2 also show two sections S2' and S3 immediately before and immediately after the capstan 6, together with said drawing zone Z1, said surface solidification zone Z2, said additional cooling zone Z3, said reheat zone Z4 level with the torch 14, and said covering zone Z5 level with the covering device 5.

Figure 3:
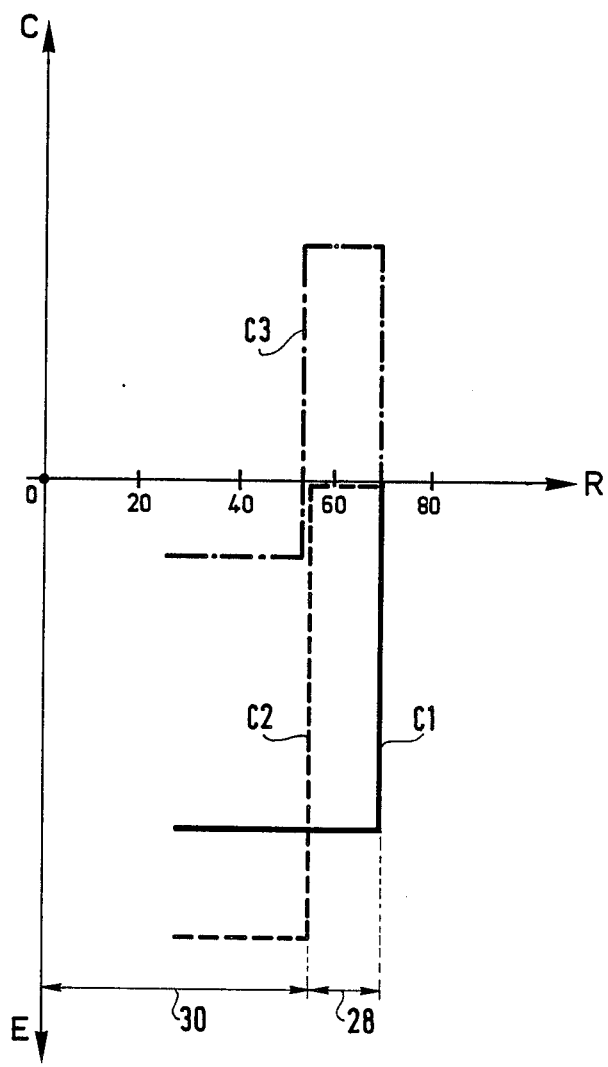
FIG. 3 is a graph showing various curves representing variation in longitudinal stress in said fiber as a function of radius from the axis of the fiber, the curves representing several successive cross-sections along said fiber.

In FIG. 3, longitudinal compression and extension stresses in fthe non-doped silica coming from the layer 22 are plotted respectively along coordinate axis OC and OE, with the radius from the fiber axis A being plotted along coordinate axis OR. Solid line curve C1, dashed line curve C2, and dot-dashed line curve C3 substantially represent the variation in longitudinal stress in the non-doped silica in sections S1 & S1', S2 &S2', and S3, respectively.

In section S1, the non-doped silica solidifies under a stress which is substantially equal to Tf/S, where Tf is the fiber-drawing tension and S is the cross-sectional area of the non-doped silica. The axial portion constituted by non-doped silica is still at a temperature higher than its softening temperature and therefore cannot be under stress. In section S1', this doped silica solidifies under zero stress, without altering stress distribution.

In section S2, the softening of the surface layer 28 of silica relaxes the stresses in this layer and reduces the area of the silica cross-section that withstands the fiber-drawing tension. The extension stresses in said majority axial fraction 30 that remains solid therefore increase by an amount which itself increases with increasing thickness of softened silica. In section S2', the surface layer 28 solidifies under zero stress and the stress distribution is not changed.

In section S3, the fiber-drawing tension is removed by passing around the capstan 6, thereby shifting the set of stresses: the extension stresses in the majority axial fraction 30 are reduced and compression stresses appear in the solid surface layer because to the layer 28 has cooled. These compression stresses increase with increasing fiber-drawing tension.

I claim:

1. A method of manufacturing an optical fiber by drawing, said method being intended to provide a fiber constituted by glass and surrounded by an organic protective coating, said fiber having an axis, a fiber outside radius, and a composition which is uniform along the lengthwise direction of the fiber and which follows an internal composition law inside the fiber relating the composition of each point of the fiber to the relative radius of the point, with the relative radius of any point being given by the radio of the measured distance between said point and the axis divided by the outside radius, said method comprising the following operations:

preparing a glass preform having the same internal composition law as the fiber to be made, but having an initial outside radius which is larger than said outside radius of the fiber;

continuous fiber-drawing, said fiber-drawing comprising the following operations:

heating a lengthwise end portion of said preform in order to soften it right through to constitute a visco-elastic mass (20);

applying sufficient longitudinal fiber-drawing tension to said visco-elastic mass to cause the glass thereof to be drawn down in a drawing-down zone (Z1) with the outside radius of the mass of glass reducing progressively until said radius reaches said outside radius of the fiber, while said internal composition law is conserved such that the result of said operation is to constitute said fiber;

progressively cooling the glass from its surface in said drawing-room zne in such a manner that a sufficiently large fraction of the cross-section of said glass solidifies in a surface solidification zne (Z2) at the end of said drawing-down zone for said solidified fraction to withstand said fiber-drawing tension elastically once its outside radius reaches said outside radius of the fiber; and further cooling the fiber obtained in this way in an additional cooling zone (Z3) in order to solidify the glass of the fiber completely;

said fiber-drawing opertion being followed, in a covering zone (Z5) downstream from said additional cooling zone, by a covering operation during which said protective covering is applied around the fiber resulting from said fiber-drawing in order to protect the surface thereof;

said fiber-drawing tension being applied to said visco-elastic mass (20) and to said fiber via said protective covering in a traction zone situated downstream from said covering zone;

said method being characterized by the fact that it further includes:

treatment consisting in a surface reheating operation under tension through an average thickness lying between 5 microns and 10 microns, said operation being performed during said fiber-drawing operation in a reheat zone (Z4) between said additional cooling zone and said covering zne, and in which the outside surface of the fiber (F) under a tension lying in the range 0.4N to 1.4N is heated sufficiently to cause a surface layer (28) of said fiber to soften, thereby eliminating any surface microcracks that may result from said fiber-drawing operation, with the duration of said reheating being sufficiently short to ensure that a majority axial fraction (30) of the cross-section of the fiber remains solid and withstands said fiber-drawing tension elastically; and a second cooling operation in a second cooling zone between said reheating zone and said covering zone, thereby solidifying said surface layer while said majority axial fraction is still under tension for withstanding said fiber-drawing tension, such that said majority axial fraction retains a permanent residual tension downstream from said traction zone, thereby applying permanent longitudinal compression to said solidified surface layer.

* * * * *